March 7, 1961 — C. F. ABRESCH ET AL — 2,973,907
SPRAY DEVICE

Filed Dec. 30, 1955 — 2 Sheets-Sheet 1

INVENTORS
CAREL F. ABRESCH
ROBERT L. MERCER
BY R. R. Candor
THEIR ATTORNEY

March 7, 1961  C. F. ABRESCH ET AL  2,973,907
SPRAY DEVICE
Filed Dec. 30, 1955  2 Sheets-Sheet 2

INVENTORS
CAREL F. ABRESCH
ROBERT L. MERCER
BY R K Candor
THEIR ATTORNEY

United States Patent Office 2,973,907
Patented Mar. 7, 1961

2,973,907
SPRAY DEVICE

Carel F. Abresch and Robert L. Mercer, Dayton, Ohio, assignors to General Motors Corporation, Detroit, Mich., a corporation of Delaware Filed Dec. 30, 1955, Ser. No. 556,613

7 Claims. (Cl. 239—261)

This invention relates to a domestic appliance and more particularly to household dishwashers.

Rotatable spray tubes can constitute an effective means for washing and rinsing dishes in dishwashers. However, to be most effective there is an optimum speed of rotation coupled with heavy solid streams of water issuing therefrom in such a direction as to impinge upon both sides of the dishes at an acute angle.

It is therefore an object of this invention to provide an inexpensive molded plastic spray tube and inlet fitting which is not likely to fail to rotate for any reason and which will rotate at a substantially uniform optimum speed and deliver heavy continuous streams at desired acute angles under varying water pressure and varying rates of water flow.

These and other objects are attained in the form shown in the drawings in which the cabinet is provided with a molded plastic inlet fitting provided with a helical cavity which directs the water flow in a helical direction. The inlet fitting connects directly with the rotatable molded plastic hollow spray tube extending forward horizontally from the inlet fitting protruding through the rear wall. This turbo-spray tube is molded in an ingenious manner to provide orifices or apertures which provide radially directed streams as well as streams which issue at acute angles forwardly and rearwardly so that both sides of plates and dishes are impinged upon by the streams of water issuing from the spray tube. The spray tube and inlet fitting are each provided with a graphited plastic bearing to provide a rotatable mounting for the spray tube. The reaction of the helical water flow with the tube and its orifices causes the tube to rotate at a uniform speed.

Further objects and advantages of the present invention will be apparent from the following description, reference being had to the accompanying drawings wherein a preferred form of the invention is clearly shown.

Figure 5:
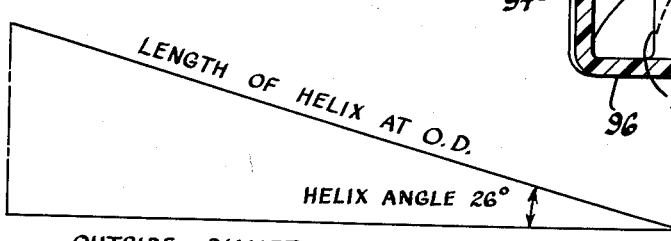
Figure 5 is a diagram of the helix within the fitting shown in Figures 1 to 4.

The inlet fitting 92 is molded of phenoformaldehyde resin to the shape shown in Figures 1 to 5 inclusive. The tubular inlet portion 90 leads directly to a helical cavity 94 including a helical rear wall 96 having a helix angle of about 26° at the outside as illustrated in Figure 5. The helical cavity 94 is bounded by the inner cylindrical wall portion 98 and the outer cylindrical wall portion 121. The outer cylindrical wall portion is provided with an outwardly extending flange 123 which is adapted to be fastened to a wall.

From the external flange 123 there extends cylindrical flange 125. Within this cylindrical flange 125 there is a shoulder 127 and a bore extending forwardly therefrom. A metal sleeve 129 fits loosely within this bore up to the shoulder 127. This sleeve protrudes from and fits tightly within the end of the cylindrical rotatable molded plastic spray tube 131. This cylindrical sleeve 129 has its inside diameter greater than the inside diameter of the opening 133 in the fitting 92. With this arrangement the water rushing through the fitting into the interior of the tube 131 causes a slight suction at the gap between the cylindrical sleeve 129 and the shoulder 127 so that water leakage is minimized at this location.

Figure 1:
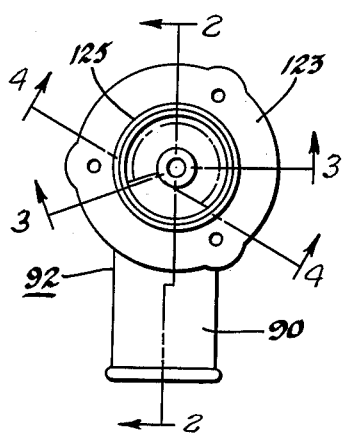
Figure 1 is a view in elevation of the inlet fitting.
Figure 2:
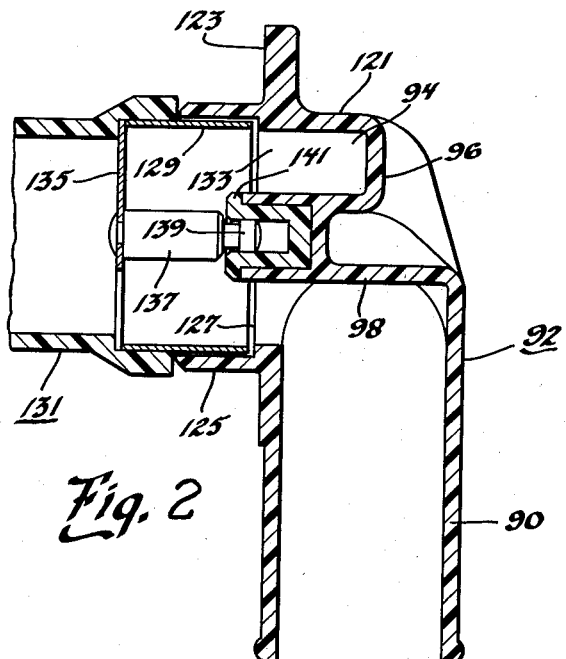
Figure 2 is an enlarged sectional view taken along the line 2—2 of Figure 1.
Figure 3:
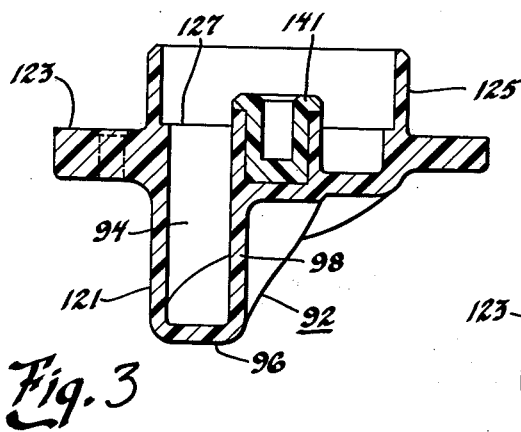
Figure 3 is a fragmentary enlarged sectional view taken along the line 3—3 of Figure 1.
Figure 4:
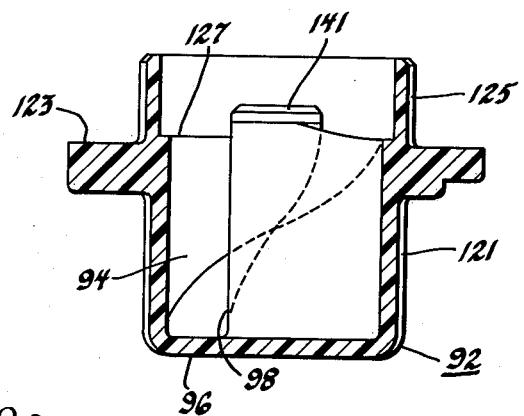
Figure 4 is a fragmentary enlarged sectional view taken along the line 4—4 of Figure 1.
Figure 6:
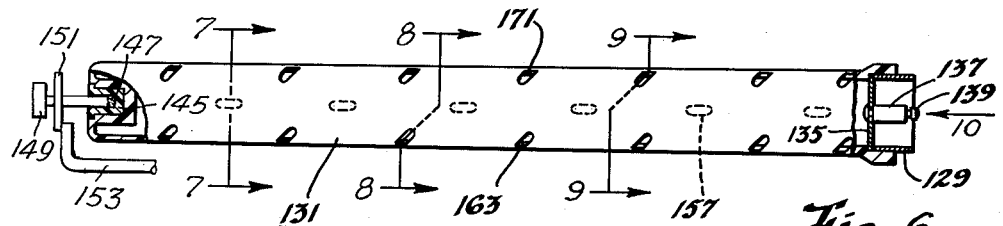
Figure 6 is a plan view of the rotating spray tube showing the skewed spray orifices.
Figure 7:
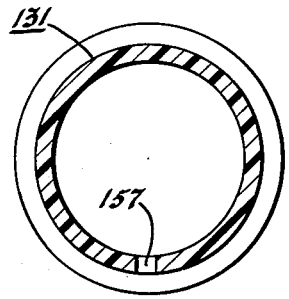
Figure 7 is a sectional view taken along line 7—7 of Figure 6 showing one of the radial orifices.
Figure 8:
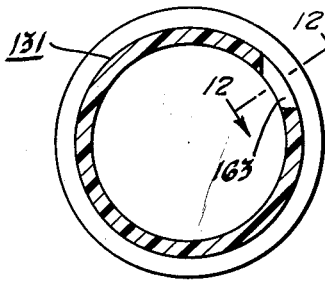
Figure 8 is a sectional view taken along line 8—8 of Figure 6 showing a forward spraying skewed orifice.
Figure 9:
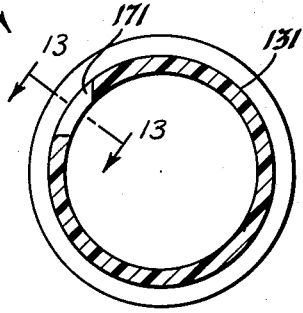
Figure 9 is a sectional view taken along line 9—9 of Figure 6 showing a rearwardly spraying skewed orifice.
Figure 10:
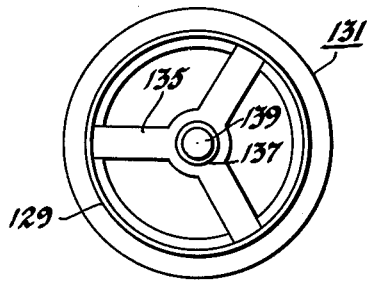
Figure 10 is a right end view taken in the direction of the arrow 10 in Figure 6.

The cylindrical sleeve 129 fits into the open end of the cylindrical rotatable tube 131. It holds in place the metal three armed spider 135 likewise fitting into the open end of the tube. Riveted to this three armed spider 135 is a stud 137 provided with a bearing extension 139 fitting within the bearing insert 141 containing graphite. This bearing insert 141 is fitted into a cavity of the inlet fitting 92 as shown in Figure 2. As shown in Figure 6 the forward end of the spray tube 131 is closed and is provided with a recess containing a similar bearing insert 145 of molded plastic containing graphite. In addition, there is inserted into the closed end of this bearing insert a graphite slug 147 which serves as a thrust bearing. The thrust upon the tube is forward since the front end is closed and the open end is rearward.

At the front end of the tube 131 there is provided a screw 149 having a bearing portion at its rear end which fits into the interior of the bearing insert 145 against the graphite slug 147 to support and provide a thrust bearing at the front end of the rotatable tube 131. This screw threads through an up turned end piece 151 in a cantilever support 153 formed of two heavy wire members which extend rearwardly and are suitably fastened.

Figure 11:
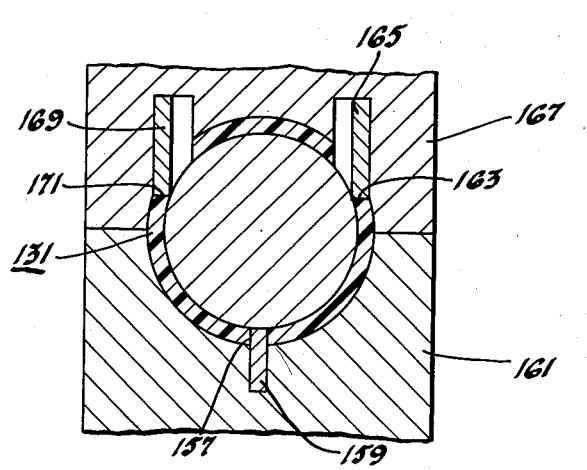
Figure 11 is a sectional view through the forming mold showing the tube in the forming of the spray tube.
Figure 12:
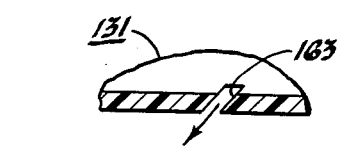
Figure 12 is a fragmentary sectional view taken along line 12—12 of Figure 8.
Figure 13:
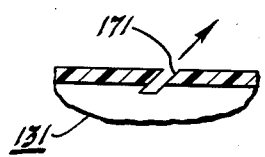
Figure 13 is a fragmentary sectional view taken along line 13—13 of Figure 9.

The cylindrical tube has on one side a row of seven radial discharge slots 157. These slots are directly perpendicular to the parting line of the tube in the mold as illustrated in Figure 11. They are formed by separate longitudinal inserts 159 in the lower half of the mold 161. Upon the opposite side of the tube 131 there is provided a row of seven forwardly discharging apertures 163. These slots 163 are formed in the opposite half of the tube 131 from the slots 157. Specifically they are located in one upper quarter section of the tube 131 and they are formed by skewed projections 165 perpendicular to the parting line of the mold 161, 167. In the other upper quarter section of the tube 131, the seven rearwardly discharging apertures 171 are formed by another set of seven skewed projections 169, arranged in a row perpendicular to the parting line of the mold 161, 167. When considered in a radial plane, these skewed projections form slanting apertures as shown in Figures 12 and 13 so that from the apertures 163 the continuous water streams extend forwardly at acute angle while in the apertures 171 the continuous streams are directed rearwardly at an acute angle. These oppositely directed streams impinge upon opposite sides of dishes so that coverage of the dishes by the continuous streams is substantially complete when the spray tube 131 rotates at a suitable speed.

This suitable speed of rotation is insured by the helical shape of the inlet fitting 92 which has outer helix angle of about 26° insuring a speed of rotation of about 500 r.p.m. This speed of rotation is substantially constant regardless of the friction losses or any minor variations in dimensions or variations in the manufacture thereof. The arrangement of the skewed inserts in the two sides of the upper half of the mold perpendicular to the parting line makes possible the straight withdrawal of the upper and lower halves 167 and 161 of the mold and yet insures that the two series 163 and 171 of apertures in the tube 131 are slanted as shown in Figures 25 and 26 so as to provide the forwardly and rearwardly directed streams.

While the form of embodiment of the invention as herein disclosed, constitutes a preferred form, it is to be understood that other forms might be adopted, as may come within the scope of the claims which follow.

What is claimed is as follows:

1. In combination, a rotatable spray tube having an open end, an inlet fitting having an outlet connecting to the open end of said spray tube, said inlet fitting having opposite the open end of said spray tube an enveloping exterior wall portion in the shape of a helix having its axis substantially coinciding with the axis of said spray tube, said fitting having an inlet connecting with said helix, and means for supplying fluid to said fitting through said inlet for discharging the fluid in a helical flow into the interior of said spray tube.

2. In combination, a rotatable spray tube of molded plastic, said tube having an open end and a closed end provided with an outwardly facing recess containing a sleeve of graphited material, an inlet fitting connecting with and rotatably supporting said open end, a supporting pin extending into said sleeve having sufficient clearance to permit the sleeve to rotate thereon, a support for said pin, and means for supplying fluid to said inlet fitting for delivery into said spray tube.

3. In combination, a rotatable spray tube of molded plastic, said tube having an open end and a closed end provided with an outwardly facing recess containing a sleeve of graphited material, an inlet fitting connecting with and rotatably supporting said open end, a supporting pin extending into said sleeve having sufficient clearance to permit the sleeve to rotate thereon, a support for said pin, a slug of graphite in the inner end of said sleeve adjacent the end of said pin, and means for supplying fluid to said inlet fitting for delivery into said spray tube.

4. In combination, a rotatable spray tube having an open end, an inlet fitting having an outlet connecting to the open end of said spray tube, said inlet fitting having a coaxial portion forming a bearing support coaxially located relative to said spray tube and said outlet, said tube having a bearing extension rotatably supported upon said bearing support, said fitting having an enveloping exterior wall portion located within the axial projection of the spray tube shaped in the form of a helix extending around and forming said bearing support at its inner edges, said fitting having an inlet connecting with said helix, and means for supplying fluid to said fitting through said inlet for discharging the fluid in a helical flow into the interior of said spray tube.

5. In combination, a rotatable spray tube having an open end, an inlet fitting having an outlet connecting to the open end of said spray tube, said inlet fitting having a coaxial portion forming a bearing support coaxially located relative to said spray tube and said outlet, said tube having a bearing extension rotatably supported upon said bearing support, said fitting having an exterior wall portion located within the axial projection of the spray tube shaped in the form of a wide flat helix extending around and joining said bearing support at its inner edges, said helix having the major portion of its inner surface substantially perpendicular to the axis of said tube, said fitting having an inlet connecting with said helix, and means for supplying fluid to said fitting through said inlet for discharging the fluid in a helical flow into the interior of said spray tube.

6. In combination, a molded rotatable spray tube, means for rotatably supporting said tube, said tube having a longitudinally arranged series of discharge slots with wall surfaces thereof perpendicular to a longitudinal plane passing through the axis of the tube but having their individual projections each offset from the axis of the tube and skewed relative to the axis of the tube so that the slots are at an angle to the axis with reference to a radius passing through the slot, and means for delivering a fluid into said tube.

7. In combination, a molded rotatable spray tube, means for rotatably supporting said tube, said tube having a longitudinally arranged series of discharge slots with the wall surfaces thereof perpendicular to a longitudinal plane passing through the axis of the tube but having their individual projections each offset from the axis of the tube and skewed relative to the axis of the tube so that the slots are at an angle to the axis with reference to a radius passing through the slot, said tube having a second series of discharge slots located in an adjacent quarter circle from said first mentioned series of discharge slots on the same side of said longitudinal plane, said slots of said second series also having the wall surfaces thereof perpendicular to the same longitudinal plane and also having their individual projections offset from and skewed relative to the axis of the tube, and means for delivering a fluid into said tube.

References Cited in the file of this patent

UNITED STATES PATENTS

| | | |
|---|---|---|
| Re. 15,670 | Rosenbaum | Aug. 7, 1923 |
| 925,241 | Stauft | June 15, 1909 |
| 1,397,100 | Johnson | Nov. 15, 1921 |
| 1,775,162 | Fisk | Sept. 9, 1930 |
| 1,831,007 | Johnson | Nov. 10, 1931 |
| 1,847,406 | McArdle | Mar. 1, 1932 |
| 1,876,250 | Lassen | Sept. 6, 1932 |
| 1,940,626 | Holub | Dec. 19, 1933 |
| 1,977,977 | Walker | Oct. 23, 1934 |
| 2,064,072 | McArdle | Dec. 15, 1936 |
| 2,176,243 | Braungart | Oct. 16, 1939 |
| 2,418,919 | Benson | Apr. 15, 1947 |
| 2,499,179 | Boddy | Feb. 28, 1950 |
| 2,529,262 | Ratliff | Nov. 7, 1950 |
| 2,664,903 | Sway | Jan. 5, 1954 |
| 2,731,294 | Rothweiler | Jan. 17, 1956 |